United States Patent
Friedrich et al.

[11] Patent Number: 5,791,319
[45] Date of Patent: Aug. 11, 1998

[54] METHOD FOR CONTROLLING AN EXHAUST GAS RECIRCULATION DEVICE IN AN INTERNAL COMBUSTION ENGINE

[75] Inventors: Arno Friedrich, Regensburg, Germany; Klaus Wenzlawski, Nürnberg, Germany

[73] Assignee: Siemens Aktiengesellschaft, Munich, Germany

[21] Appl. No.: 791,628

[22] Filed: Jan. 31, 1997

[30] Foreign Application Priority Data

Jan. 31, 1996 [DE] Germany .................. 196 03 472.8

[51] Int. Cl.⁶ .................................................. F02M 25/07
[52] U.S. Cl. .................................................. 123/571
[58] Field of Search ........................ 123/568, 569, 123/571; 60/605.2

[56] References Cited

U.S. PATENT DOCUMENTS

| | | | |
|---|---|---|---|
| 4,467,775 | 8/1984 | Buck et al. | 123/571 |
| 5,205,260 | 4/1993 | Takahashi et al. | 123/571 |
| 5,261,373 | 11/1993 | Ohsuga et al. | 123/571 |
| 5,377,651 | 1/1995 | Sczomak et al. | 123/571 |
| 5,515,833 | 5/1996 | Cullen et al. | 123/571 |
| 5,601,068 | 2/1997 | Nozaki | 123/571 |
| 5,619,974 | 4/1997 | Rodefeld et al. | 123/571 |

FOREIGN PATENT DOCUMENTS

| | | |
|---|---|---|
| 31 45 527 A1 | 5/1983 | Germany . |
| 195 02 368 A1 | 8/1996 | Germany . |

*Primary Examiner*—Willis R. Wolfe
*Attorney, Agent, or Firm*—Herbert L. Lerner; Laurence A. Greenberg

[57] ABSTRACT

A method for controlling an exhaust gas recirculation device in an internal combustion engine includes calculating an actual value of an exhaust gas recirculation rate from a current air flow rate measured by an air flow rate meter and a theoretical air flow rate that would result without exhaust gas recirculation. A difference is formed from a desired value stored as a function of load and from the actual value for the exhaust gas recirculation rate. The difference is supplied to a controller which triggers an exhaust gas recirculation valve in such a way that a desired value of the exhaust gas recirculation rate is established.

14 Claims, 3 Drawing Sheets

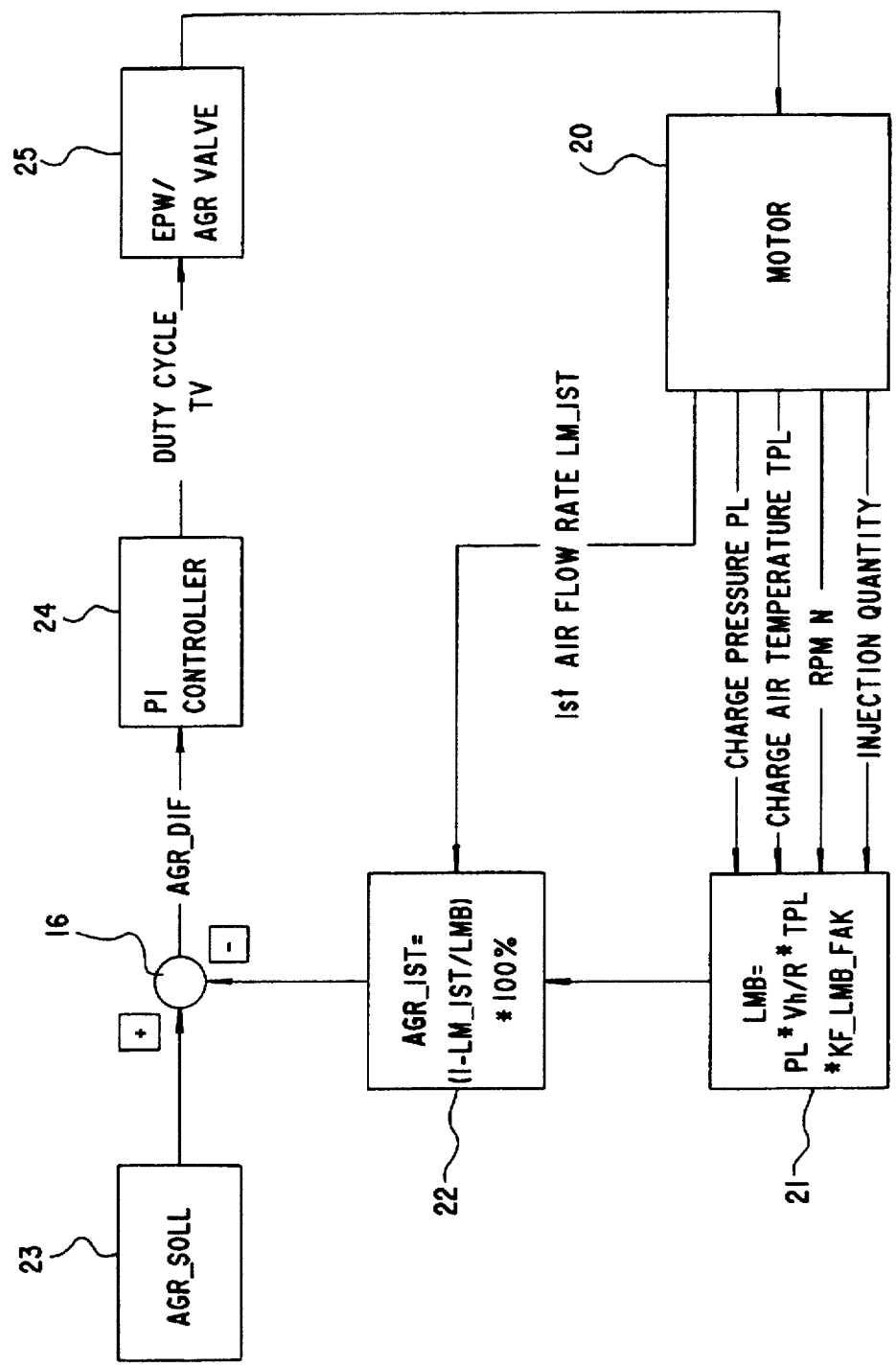

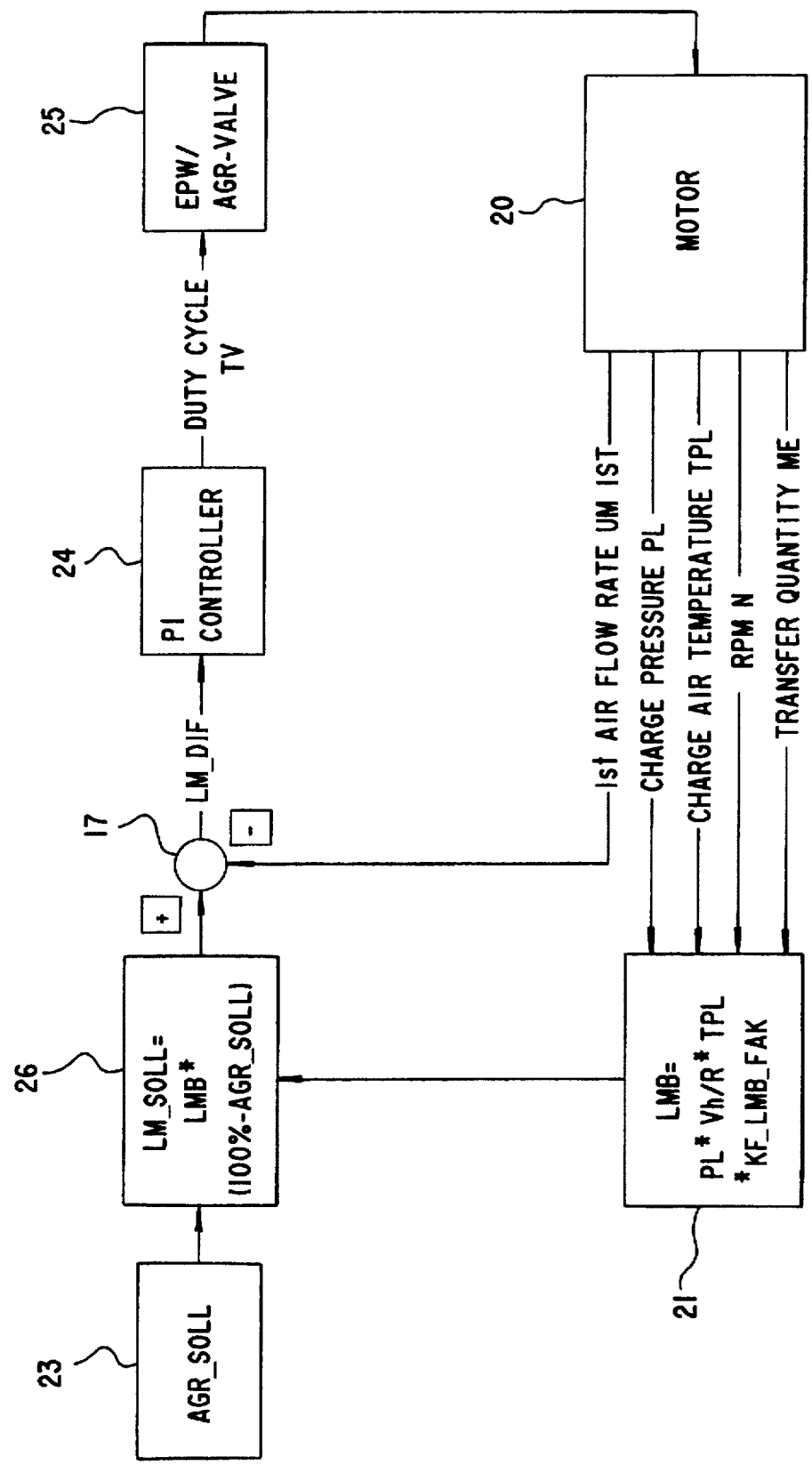

METHOD FOR CONTROLLING AN EXHAUST GAS RECIRCULATION DEVICE IN AN INTERNAL COMBUSTION ENGINE

BACKGROUND OF THE INVENTION

Field of the Invention

The invention relates to a method for controlling the exhaust gas recirculation rate of an internal combustion engine operating with an exhaust gas recirculation system, including an exhaust gas recirculation line connecting an exhaust tract with an intake tract and having an opening cross section which can be influenced by a controllable exhaust gas recirculation valve.

Exhaust gas recirculation devices in internal combustion engines are used to reduce the proportion of nitrogen oxide in the exhaust gas. Since the exhaust gas of the internal combustion engine, in its essential components, is an inert gas, the peak combustion temperature can be lowered by admixing exhaust gas with the aspirated combustion air, and the $NO_x$ emissions can thus be reduced. However, the hydrocarbon (HC) and carbon monoxide (CO) emissions of the engine cannot be reduced by the exhaust gas recirculation. The quantity of exhaust gas being recirculated, which is generally referred to as the exhaust gas recirculation rate, must in fact be adhered to as precisely as possible, because otherwise the result is an increase in the proportions of HC and CO in the exhaust gas.

As a rule, adjusting the exhaust gas recirculation rate is carried out through an electrically or pneumatically triggerable valve that varies the opening cross section of a return line connecting the exhaust tract with the intake tract.

In known engine controllers, the triggering variable for the exhaust gas recirculation valve is calculated with an open-loop or closed-loop control algorithm. The disadvantage of purely open-loop control is the inaccuracy of the exhaust gas recirculation rate, which is the result of both varying ambient conditions and variations among control mechanisms. Those inaccuracies can be prevented by closed-loop control. In general, the current air mass is detected as a guide variable of the closed-loop control unit, with an air flow rate meter and compared with a desired air flow rate value. A disadvantage of proceeding in that way is that the actual exhaust gas recirculation rate, which after all is the characteristic variable for the exhaust gas recirculation, is not apparent. The absence of that variable unnecessarily makes adaptation more difficult.

In a method and an apparatus for controlling the quantity of exhaust gas recirculated from the exhaust gas system of an internal combustion engine to the intake side, which is known from German Published, Non-Prosecuted Patent Application DE 31 45 527 A1, the aspirated air quantity is compared with a desired value formed as a function of load and rpm. If a deviation occurs that is greater than a minimum amount, control pulses for two magnet valves are formed, which are triggered alternatively depending on the direction of the deviation and which carry pressure from two pressure sources at different levels in a work chamber of a pneumatic actuator of an exhaust gas recirculation metering valve. The opening duration of the respective valve depends on the magnitude of the desired value deviation, and it remains fully open until the correction in the opposition direction, if the desired value deviation exceeds a predetermined maximum amount. The control pulses formed in the range between minimum and maximum deviation from the desired value, are each sent on to the magnet valves, after a certain waiting period, which can be made dependent on rpm.

SUMMARY OF THE INVENTION

It is accordingly an object of the invention to provide a method for controlling an exhaust gas recirculation device in an internal combustion engine, which overcomes the hereinafore-mentioned disadvantages of the heretofore-known methods of this general type and with which an exhaust gas recirculation rate can be adjusted to a predetermined desired value in a simple way.

With the foregoing and other objects in view there is provided, in accordance with the invention, a method for controlling the exhaust gas recirculation rate of an internal combustion engine operating with an exhaust gas recirculation system, which comprises connecting an exhaust tract of an engine to an intake tract of the engine with an exhaust gas recirculation line having an opening cross section and a controllable exhaust gas recirculation valve influencing the opening cross section; calculating a theoretical air flow rate value which would be supplied to the engine at a particular time if no exhaust gas recirculation were active; correcting the air flow rate value by a correction factor as a function of an operating point in accordance with a current degree of delivery; calculating an actual value for the exhaust gas recirculation rate from the corrected theoretical air flow rate value and from the actual value of the air flow rate; storing desired values for the exhaust gas recirculation rate in % as a function of the operating point; forming a difference from the desired value and the actual value of the exhaust gas recirculation rate; and supplying the difference to a control device triggering the exhaust gas recirculation valve for adjusting a desired value of the exhaust gas recirculation rate.

In accordance with another mode of the invention, there is provided a method which comprises calculating the theoretical air flow rate LMB with a general gas equation:

$$LMB = \frac{PL * VH}{R * TPL}$$

in which PL=charge pressure; VH=cylinder stroke volume; TPL=charge air temperature (absolute); and R=gas constant.

In accordance with a further mode of the invention, there is provided a method which comprises ascertaining the theoretical air flow rate from a number of performance graphs determined as a function of the engine operating point, intake pressure and intake temperature.

In accordance with an added mode of the invention, there is provided a method which comprises operating the control device with proportional or proportional/integral behavior with the difference, and furnishing a controlled variable for the exhaust gas recirculation valve at an output of the control device.

In accordance with an additional mode of the invention, there is provided a method which comprises storing the desired value for the exhaust gas recirculation rate in a performance graph as a function of at least one of coolant temperature, ambient temperature and ambient pressure.

In accordance with yet another mode of the invention, there is provided a method which comprises calculating the actual value for the exhaust gas recirculation rate AGR_IST with the following equation:

$$AGR\_IST=(1-LM\_IST/LMB)*100$$

in which LMB=theoretical air flow rate value; and LM_IST=actual value of air flow rate.

With the objects of the invention in view there is also provided a method for controlling the exhaust gas recirculation rate of an internal combustion engine operating with an exhaust gas recirculation system, which comprises connecting an exhaust tract of an engine to an intake tract of the engine with an exhaust gas recirculation line having an opening cross section and a controllable exhaust gas recirculation valve influencing the opening cross section; calculating a theoretical air flow rate value which would be supplied to the engine at a particular time if no exhaust gas recirculation were active; correcting the air flow rate value by a correction factor as a function of an operating point in accordance with a current degree of delivery; storing desired values for the exhaust gas recirculation rate in % as a function of the operating point; calculating a desired value for the air flow rate from the corrected theoretical air flow rate value and from the desired value; forming a difference from the desired value and the actual value of the air flow rate; and supplying the difference to a control device, triggering the exhaust gas recirculation valve for adjusting the desired value of the exhaust gas recirculation rate.

In accordance with a concomitant mode of the invention, there is provided a method which comprises calculating the desired value for the air flow rate LM_SOLL with the following equation:

$$LM\_SOLL = LMB*(100\% - AGR\_SOLL)$$

in which LMB=theoretical air flow rate value; and AGR_SOLL=exhaust gas recirculation rate.

Other features which are considered as characteristic for the invention are set forth in the appended claims.

Although the invention is illustrated and described herein as embodied in a method for controlling an exhaust gas recirculation device in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a block circuit diagram for determining a triggering variable for the exhaust gas recirculation, using an exhaust gas recirculation rate as a guide variable; and FIG. 3 is a block circuit diagram for determining the triggering variable for the exhaust gas recirculation, using an air flow rate as a guide variable.

DESCRIPTION OF THE PREFERRED EMBODIMENTS

Figure 1:
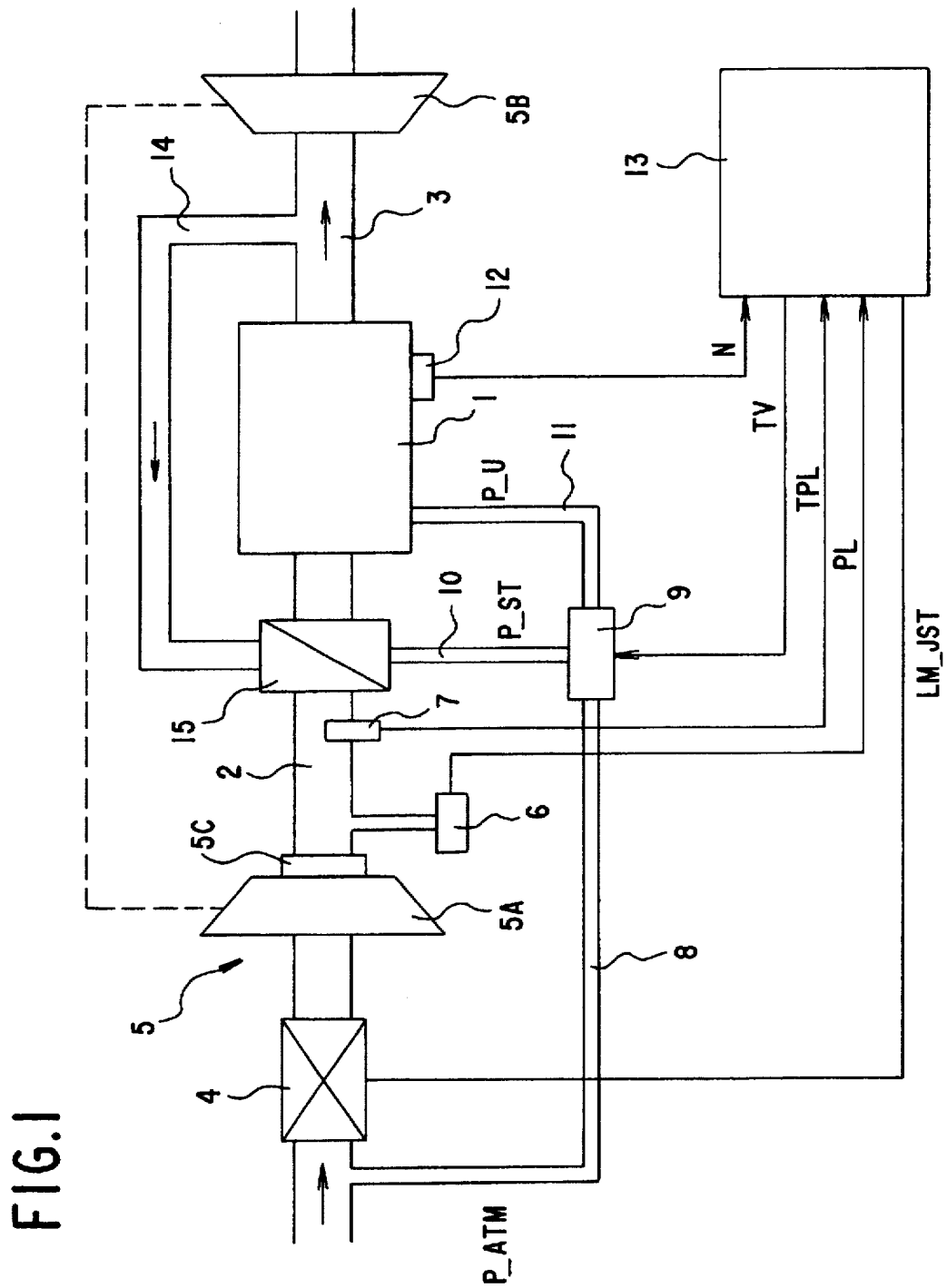
FIG. 1 is a highly simplified block circuit diagram of an internal combustion engine with exhaust gas recirculation for performing the method of the invention.

Referring now to the figures of the drawings in detail and first, particularly, to FIG. 1 thereof, there is seen a Diesel internal combustion engine 1, in which only those parts of the engine that are necessary for comprehension of the invention are shown. The engine 1 receives fresh air necessary for combustion through an intake tract or pipe 2, and exhaust gases are expelled through an exhaust tract or pipe 3, after conversion in a non-illustrated exhaust gas catalytic converter. An air flow rate meter 4, which is disposed in the intake tract 2, detects the currently aspirated air flow rate and outputs a signal LM, corresponding to this air flow rate, to an electronic control unit 13 of the engine. An exhaust gas turbocharger, which is known per se, is provided in order to increase the cylinder charge and therefore to increase the power of the engine 1. The exhaust gas turbocharger has a turbine wheel 5B which is disposed in the exhaust tract 3 and is operatively connected through a shaft that is represented by dashed lines but is not identified by a reference numeral, to a compressor wheel 5A in the intake tract 2. The exhaust gases thus drive the turbine, which in turn drives the compressor. The compressor takes on the task of aspiration and furnishes a precompressed fresh charge to the engine. A charge air cooler 5C downstream of the compressor dissipates the heat of compression through the coolant circuit of the engine. As a result, the cylinder charge can be further improved.

In order to adapt the exhaust gas turbocharger to the requirements of the engine, the charge pressure of the compressed fresh air being supplied is regulated with the aid of a non-illustrated charge pressure regulator. The engine is thus protected against excessively high charge pressures as a function of the operating state and of ambient conditions. At the same time, the rpm of the turbocharger can be limited, and its service life thereby prolonged.

A charge pressure PL and a charge air temperature TPL are detected by corresponding sensors 6 and 7 in the intake tract 2 downstream of the charge air cooler 5C and are carried on to the electronic control unit 13. The control unit is also supplied with an output signal of an rpm sensor 12, which signal corresponds to an rpm N of the engine 1.

An exhaust gas recirculation line 14 is provided in order to return a portion of the exhaust gas in the direction represented by arrow symbols. The exhaust gas recirculation line 14 connects the exhaust tract 3 with the intake tract 2 in such a way that exhaust gas is diverted, upstream of the turbine wheel 5B of the exhaust gas turbocharger, and returned again to the intake tract 2 at a point downstream of the charge air cooler 5C.

A pneumatic exhaust gas recirculation valve 15 is incorporated into the exhaust gas recirculation line 14. In order to establish whichever exhaust gas recirculation rate is optimal at the time, the exhaust gas recirculation valve 15 is triggered by the electronic control unit 13 through an electropneumatic converter 9 through the use of a duty cycle or controlled variable TV.

On one side, the electropneumatic converter 9 communicates with the intake tract 2 through an air line 8 which branches off upstream of the air flow rate meter 4 in terms of the flow direction of the aspirated air, at a location where an ambient pressure P_ATM therefore prevails. On the other side, the electropneumatic converter 9 communicates through an air line 11 with a location of the engine 1 that generates a negative pressure P_U. The electropneumatic converter 9 has an outlet side which acts upon the exhaust gas recirculation valve 15 with a control pressure P_ST in a control line 10.

Instead of the electropneumatic converter/pneumatic exhaust gas recirculation valve system, an electrically actuated exhaust gas recirculation valve may also be used.

A first possibility for calculating a triggering variable for the exhaust gas recirculation, with which the exhaust gas recirculation rate can be applied directly as a numerical value in percent in the electronic control unit, will be disclosed in conjunction with the block circuit diagram of FIG. 2. The exhaust gas recirculation rate is used as a guide variable.

A motor of the internal combustion engine is combined in a block 20 with sensors that are necessary for operating the engine, and especially for operation with exhaust gas recirculation, such as the air flow rate meter, rpm sensor, and pressure and temperature sensors. In a block 21, a theoretical air flow rate without exhaust gas recirculation, which is also referred to as a basic air flow rate LMB, is calculated with the aid of a general gas equation:

$$LMB = \frac{PL * VH}{R * TPL} \quad (1)$$

in which:
PL=charge pressure
Vh=cylinder stroke volume
TPL=charge air temperature (absolute)
R=gas constant Due to the variable degree of delivery at various operating points of the engine, this basic air flow rate LMB must be adapted to the operating point. This is done with the aid of a correction factor KF_LMB_FAK, which is dependent on the operating point. A first performance graph which is therefore provided in a memory of the electronic control unit 13 stores various values for the correction factor KF_LMB_FAK as a function of the load and rpm. Typical values for the correction factor are between 0.5 and 2.0.

The basic air flow rate LMB, corrected as a function of the operating point, is thus obtained as:

$$LMB = \frac{PL * VH}{R * TPL} * KF\_LMB\_FAK \quad (2)$$

Accordingly, the air flow rate that would be supplied to the engine under the same conditions without exhaust gas recirculation is calculated.

The actual value of the exhaust gas recirculation rate AGR_IST is calculated from this corrected basic air flow rate LMB and the current air flow rate actually aspirated by the engine, which is measured by the air flow rate meter 4 of FIG. 1 and is designated in this case in a block 22 as the actual air flow rate LM_IST, in accordance with the following equation:

$$AGR\_IST = (1 - LM\_IST/LMB) * 100 \quad (3)$$

In order to calculate the desired value for regulating the exhaust gas recirculation, a further performance graph is provided, which contains values as a function of the load and rpm for the desired exhaust gas recirculation rate AGR_SOLL in percent, as is seen in a block 23.

In addition, this desired value AGR_SOLL may also be made dependent on other parameters, such as coolant temperature, ambient pressure, ambient temperature, and so forth.

The desired value AGR_SOLL read out of the performance graph and the calculated actual value AGR_IST are carried to a comparison point 16, and a difference AGR_DIF ascertained from them between the desired and actual exhaust gas recirculation rates is used to operate a controller with proportional or proportional/integral behavior as seen in a block 24, and to calculate a controlled variable (duty cycle TV) for triggering the electropneumatic converter and therefore for controlling the exhaust gas recirculation valve as seen in a block 25.

A further possibility for determining the triggering variable for the exhaust gas recirculation includes calculating a desired air flow rate, using the theoretical air flow rate calculated from equation 2 and the desired exhaust gas recirculation rate. The air flow rate then becomes the guide variable for the controller, and the control difference between the desired air flow rate and the measured air flow rate is calculated. FIG. 3 shows an associated block circuit diagram in which the blocks that have the same functions as in FIG. 2 are identified by the same reference numerals. A desired value for the air flow rate LM_SOLL is calculated in a block 26 from the theoretical air flow rate LMB seen in the block 21 and the desired value of the exhaust gas recirculation rate AGR_SOLL, which is read out of the performance graph as a function of the load and the rpm, in accordance with the following equation:

$$LM\_SOLL = LMB * (100\% - AGR\_SOLL) \quad (4)$$

This desired value LM_SOLL and the actual value LM_IST measured by the air flow rate meter are delivered to a comparison point 17, an ascertained difference AGR_DIF between the desired and actual air flow rate values is formed, and a controller with proportional or proportional/integral behavior is operated as seen in the block 24, and a controlled variable (duty cycle TV) for triggering the electropneumatic converter and therefore for controlling the exhaust gas recirculation valve is calculated as seen in the block 25, a function of the ascertained difference.

As an alternative to the general gas equation, the theoretical air flow rate can be ascertained through the use of a series of performance graphs, which must be adapted as a function of the engine operating point as well as the charge pressure and the intake temperature.

The essential advantage of the method described herein resides in its low effort and expense of adaptation and the clear representation of the desired and actual exhaust gas recirculation rates. The method of the invention has been explained in terms of a Diesel engine, but it can be used advantageously in an Otto engine with exhaust gas recirculation as well as in internal combustion engines that have no exhaust gas turbocharger.

We claim:

1. A method for controlling the exhaust gas recirculation rate of an internal combustion engine operating with an exhaust gas recirculation system, which comprises:

connecting an exhaust tract of an engine to an intake tract of the engine with an exhaust gas recirculation line having an opening cross section and a controllable exhaust gas recirculation valve influencing the opening cross section;

calculating a theoretical air flow rate value which would be supplied to the engine at a particular time if no exhaust gas recirculation were active;

correcting the air flow rate value by a correction factor as a function of an operating point in accordance with a current degree of delivery;

calculating an actual value for the exhaust gas recirculation rate from the corrected theoretical air flow rate value and from the actual value of the air flow rate;

storing desired values for the exhaust gas recirculation rate in % as a function of the operating point;

forming a difference from the desired value and the actual value of the exhaust gas recirculation rate; and supplying the difference to a control device triggering the exhaust gas recirculation valve for adjusting a desired value of the exhaust gas recirculation rate.

2. The method according to claim 1, which comprises calculating the theoretical air flow rate LMB with a general gas equation:

$$LMB = \frac{PL * VH}{R * TPL}$$

in which:

PL=charge pressure;

VH=cylinder stroke volume;

TPL=charge air temperature (absolute); and

R=gas constant.

3. The method according to claim 1, which comprises ascertaining the theoretical air flow rate from a number of performance graphs determined as a function of the engine operating point, intake pressure and intake temperature.

4. The method according to claim 1, which comprises operating the control device with proportional behavior with the difference, and furnishing a controlled variable for the exhaust gas recirculation valve at an output of the control device.

5. The method according to claim 1, which comprises operating the control device with proportional/integral behavior with the difference, and furnishing a controlled variable for the exhaust gas recirculation valve at an output of the control device.

6. The method according to claim 1, which comprises storing the desired value for the exhaust gas recirculation rate in a performance graph as a function of at least one of coolant temperature, ambient temperature and ambient pressure.

7. The method according to claim 1, which comprises calculating the actual value for the exhaust gas recirculation rate AGR_IST with the following equation:

$$AGR\_IST=(1-LM\_IST/LMB)*100$$

in which:

LMB=theoretical air flow rate value; and

LM_IST=actual value of air flow rate.

8. A method for controlling the exhaust gas recirculation rate of an internal combustion engine operating with an exhaust gas recirculation system, which comprises:

connecting an exhaust tract of an engine to an intake tract of the engine with an exhaust gas recirculation line having an opening cross section and a controllable exhaust gas recirculation valve influencing the opening cross section;

calculating a theoretical air flow rate value which would be supplied to the engine at a particular time if no exhaust gas recirculation were active;

correcting the air flow rate value by a correction factor as a function of an operating point in accordance with a current degree of delivery;

storing desired values for the exhaust gas recirculation rate in % as a function of the operating point;

calculating a desired value for the air flow rate from the corrected theoretical air flow rate value and from the desired value;

forming a difference from the desired value and the actual value of the air flow rate; and supplying the difference to a control device, triggering the exhaust gas recirculation valve for adjusting the desired value of the exhaust gas recirculation rate.

9. The method according to claim 8, which comprises calculating the theoretical air flow rate LMB with a general gas equation:

$$LMB = \frac{PL * VH}{R * TPL}$$

in which:

PL=charge pressure;

VH=cylinder stroke volume;

TPL=charge air temperature (absolute); and

R=gas constant.

10. The method according to claim 8, which comprises ascertaining the theoretical air flow rate from a number of performance graphs determined as a function of the engine operating point, intake pressure and intake temperature.

11. The method according to claim 8, which comprises operating the control device with proportional behavior with the difference, and furnishing a controlled variable for the exhaust gas recirculation valve at an output of the control device.

12. The method according to claim 8, which comprises operating the control device with proportional/integral behavior with the difference, and furnishing a controlled variable for the exhaust gas recirculation valve at an output of the control device.

13. The method according to claim 8, which comprises storing the desired value for the exhaust gas recirculation rate in a performance graph as a function of at least one of coolant temperature, ambient temperature and ambient pressure.

14. The method according to claim 8, which comprises calculating the desired value for the air flow rate LM_SOLL with the following equation:

$$LM\_SOLL=LMB*(100\%-AGR\_SOLL)$$

in which:

LMB=theoretical air flow rate value; and

AGR_SOLL=exhaust gas recirculation rate.

* * * * *